(12) United States Patent
Ockman

(10) Patent No.: US 6,816,627 B2
(45) Date of Patent: Nov. 9, 2004

(54) SYSTEM FOR MORPHOLOGICAL IMAGE FUSION AND CHANGE DETECTION

(75) Inventor: Norman Ockman, Longwood, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 609 days.

(21) Appl. No.: 09/832,832

(22) Filed: Apr. 12, 2001

(65) Prior Publication Data

US 2002/0150304 A1 Oct. 17, 2002

(51) Int. Cl.$^7$ .............. G06K 9/36; G06K 9/42; G06K 9/56
(52) U.S. Cl. ............... 382/284; 382/308; 382/257
(58) Field of Search .................. 382/260, 262, 382/265, 266, 275, 284, 308, 312, 318, 173, 257; 358/1.9

(56) References Cited

U.S. PATENT DOCUMENTS

| | | |
|---|---|---|
| 5,022,085 A | 6/1991 | Cok |
| 5,048,109 A * | 9/1991 | Bloomberg et al. ......... 382/164 |
| 5,185,808 A | 2/1993 | Cok |
| 5,196,922 A | 3/1993 | Yeomans |
| 5,313,226 A | 5/1994 | Takakura et al. |
| 5,325,449 A | 6/1994 | Burt et al. |
| 5,488,674 A | 1/1996 | Burt et al. |
| 5,524,071 A | 6/1996 | Yokomizo |
| 5,611,033 A | 3/1997 | Pitteloud et al. |
| 5,625,765 A | 4/1997 | Ellenby et al. |
| 5,630,037 A | 5/1997 | Schindler |
| 5,657,095 A | 8/1997 | Yoshida et al. |
| 5,684,887 A * | 11/1997 | Lee et al. .................... 382/107 |
| 6,269,194 B1 * | 7/2001 | Nichani ...................... 382/270 |
| 6,397,889 B1 * | 6/2002 | Rieger ................... 137/625.21 |
| 6,463,175 B1 * | 10/2002 | Lee ............................. 382/190 |

OTHER PUBLICATIONS

N.J. Ockman et al., "*Application of Morphological Filters to Infrared Search and Track Signal Processing*", National Infrared Information Symposium, National Bureau of Standards, Boulder Colorado, May 24–26, 1988, pp. 1–24.

* cited by examiner

Primary Examiner—Kanji Patel
(74) Attorney, Agent, or Firm—Burns, Doane, Swecker & Mathis, L.L.P.

(57) ABSTRACT

A system capable of efficiently fusing image information from multiple sensors operating in different formats into a single composite image and simultaneously display all of the pertinent information of the original images as a single image. The disclosed invention accomplishes this by receiving image information from multiple sensors; identifying small structure or object information in each image by setting a predefined object/background threshold; separating the object or small structure from the background or large structure in each image; blending the object information from each image into a single composite object image; blending the background information from each image into a single composite background image; combining the composite object image with the composite background image to produce a composite image containing all of the pertinent information of each of the original images, and displaying a single composite image containing all of the pertinent information contained in each of the original images.

16 Claims, 11 Drawing Sheets

SYSTEM FOR MORPHOLOGICAL IMAGE FUSION AND CHANGE DETECTION

BACKGROUND

1. Field of the Invention

This invention relates in general to signal processing and more specifically, to a system for fusing two or more images from different sensors into one image.

2. State of the Art

With the advance of image sensing technology, it has become increasingly desirable to provide efficient and cost effective ways to process and display image information. Today's sensing devices often provide vast quantities of diverse information in differing forms and configurations that human operators often are unable to efficiently process visually. This situation, known as "information overload" is often worsened when relevant information is provided simultaneously in different formats on multiple user interfaces, while the human operator often must focus his attention elsewhere.

For example, a pilot must process vast quantities of information from several different input devices while simultaneously piloting his aircraft, often under conditions which are less than favorable. For instance, a military pilot, tasked with flying a mission at low level in total darkness or inclement weather, must simultaneously evade hostile forces, acquire a target and accurately deliver an ordnance, while focusing his attention on piloting and navigating his aircraft. The pilot cannot divert attention from the task at hand for more than a few seconds to interpret multiple displays which provide speed, navigation, threat, targeting, weapons systems or other types of information which may be critical to the mission and pilot survival. Thus, relevant information may go unrealized with harmful and often catastrophic results.

Specifically, one CRT in the cockpit may display images produced by an optical sensor operating in the visual spectrum, while a second CRT in the cockpit may display images produced by a sensor sampling the same scene operating in the IR spectrum, and a third CRT may display images produced by radar returns from the identical scene. Thus, to effectively process the information from each input medium the pilot must divert his attention from the task of flying and navigating the aircraft for a significant period.

Similarly, a physician performing laser surgery or some other surgical procedure would need to be aware of the relationship his instrument has to the tissue or bone in close proximity to the area under repair. Cameras and CRT displays contained on the instruments themselves offer some insight into the area of interest, however they cannot show bones or tissue hidden from visual inspection. X-ray, IR and other sensor/detection means are used to provide that type of information, which need other display interfaces, causing the physician to shift her attention between multiple displays.

Scientist and engineers have taken several approaches to increase the speed and efficiency at which a human operator can receive and process image information from multiple sensors using multiple formats. One solution has been to use split screen displays. Split screen displays partition a CRT into sections, each section displaying the same scene imaged by a different type of sensor. For instance one section may display the scene imaged using an IR sensor, while the other section will display the same scene imaged using a camera operating in the visual spectrum, and yet another section will display a radar or x-ray image of the same scene. While more efficient than making an operator scan several CRTs distributed around him, this approach still requires an operator to focus his attention on each section of the CRT and methodically extract relevant information form each image format.

Another approach has been to employ multi-mode CRT displays. These displays normally have some type of display selection capability which allows a user to switch between different display modes, each mode displaying, on full screen, an image of a scene produced by a different sensor. For example, one mode may display scene images produced by a camera operating in the visible light spectrum, while another mode may display the same scene imaged by an IR sensor while yet another mode may display the same scene imaged by a radar or x-ray unit. This approach reduces the number of CRT displays necessary for displaying the image information, however it requires an operator to select the display mode and to focus attention on multiple displays modes to extract relevant information unique to each display mode (sensor).

Methods and systems are known for fusing image information from multiple sensors operating in different formats into a single composite image simultaneously displaying relevant information from each sensor.

However, known methods of fusing multiple images into a single composite image generally employ linear filter approaches followed by simply adding the images together pixel by pixel. Conventional linear filtering approaches create a new image by calculating a weighted average of the pixel intensities in the local area of the original image. In linear filtering his is referred to as a convolution operation. A small mask representing the "weights" to be used in the average is moved across an intensity plot of the scene. Each pixel covered by the mask is multiplied by the appropriate weighting factor. The sum of all of the weighted pixels values becomes the new pixel value in the new image. FIG. 1, is an example of such an intensity plot 100, in which the image intensity is plotted across a selected horizontal line of an scene. The plot is across a selected horizontal line of a scene, thus the y coordinates are not apparent in FIG. 1. The peaks and valleys in the intensity plot are representative of the changes in intensity as the sensor samples a scene. A rapid change in intensity, such as shown by event 102, or event 108 suggests some change in the scene such as moving from background to an object or from object to background.

Generally, high frequency structure (that is, a pronounced change in the intensity over a short distance, or a small area of pixels), is associated with objects within a given image while low frequency structure (that is, a change covering a larger distance or area) is associated with the background.

Prior image fusion methods use conventional linear filtering to separate high frequencies, from the background by tracing the movement of a convolution mask (for example, element 104, represented as a window) as it slides over the intensity plot of the scene as shown in FIG. 1. Conventional linear filters remove high frequencies from the image scene to produce a new background or low frequency image by using a weighted average of the input image intensity 100 calculated over element 104 to produce the intensity plot as shown in FIG. 2. In this case element 104 is a convolution filter or convolution mask containing the weighs used in the local average.

The difficulty in using linear filtering techniques is that actual objects in a scene or image are composed of many different frequencies. Both large and small object contain high frequencies (e.g., the edges). Just removing high frequencies from an image will remove small objects or structure, but will also blur the edges of the large objects. Thus, modifying the frequency content of an image is a poor method for modifying the content of an image.

The use of a linear filter, allows the intensity of a small objects to affect the intensity values of local areas, causing residual "bumps" 202 and 208 to be left at the location of a small object filtered from a scene as shown. This practice of employing an average can cause an undesirable blur 210 at places on the image where there is a pronounced change in intensity, such as a change in the background of the scene 110 or the onset of an object contained therein as shown by 102 and 108 of FIG. 1. Thus conventional linear filtering tends to blur the separation between objects and the background and is thus inefficient when tasked with extracting objects from imagery. As a result, the use of conventional linear filters in image fusion applications has been limited in using the local high frequency content of the imagery as a parameter in determining the intensity of the fused image at that location. Object identification is not attempted. This blurring effect common to linear filtering techniques also makes the system vulnerable to high frequency noise or fine grained structure patterns within the imagery. This effect also produces color stability problems when a scenes processed using linear filter techniques are displayed in color. The effect is magnified when the scene is changing or when in employed in a dynamic environment.

SUMMARY OF THE INVENTION

The present invention is directed to a structure or object oriented method and system for efficiently fusing image information from multiple sensors operating in different formats into a single composite image simultaneously displaying all of the pertinent information of the original images. The present invention finds objects and structure within the various images which meet a very general user defined size and shape criteria. It then inserts these objects into the fused image. The background of the fused images is obtained by the combination of the backgrounds of the input images after the objects have been removed. The various objects can be intensity or color coded based on their intensities in the source image from which each object came.

The present invention employs morphological filters or shape filters to process multiple signals produced by one or more imaging devices, separating the background image signals from the object image signals produced by each device on the basis of object size or structure orientation (independent of its intensity), thus eliminating the blurring normally associated with conventional linear image processing.

Morphological filters do not use a convolution mask or a weighted average of the local pixels. Instead morphological filters use a "structuring element' which defines the size (and shape) of the intensity profiles that the user wants to use as a definition of the size and shape of an object.

Once the objects are removed from the backgrounds the various image signals are combined into one or more composite images, allowing a user to display selected information from several scenes as a single scene or image.

According to one aspect of the invention a system employing nonlinear morphological or shape filters provides for the fusion selected images from different sensors sampling the same or substantially the same scene into one or more composite images.

According to another aspect of the invention, images from the same sensor sampling a scene at different times is fused into a single image. This image may be presented on a single display.

According to yet another aspect of this invention, via the use of nonlinear filters, objects contained in an image scene are distinguished from the background structure of the scene based on size or structure.

According to another aspect of the present invention, images from different sensors are fused into a composite image. The images from different sensors may be color coded and selectively presented as a single image scene on a means for display.

According to yet another aspect of the present invention selected images from a single sensor sampling a scene at different times are fused into a single image. The images may be color coded based on the point in time sampled and presented as a single image scene on a means for display.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

In the following description, specific details are set forth in order to provide a through understanding of the invention. However, it will be apparent to those skilled in the art that in invention can be practiced in other embodiments that depart from these specific details.

The present invention is directed to a system which employs morphological filters in image processing. Morphological filters can be implemented in various ways such as maximum/minimum operations, dilate/erode operations, or order statistic operations such as median filters.

Figure 4:
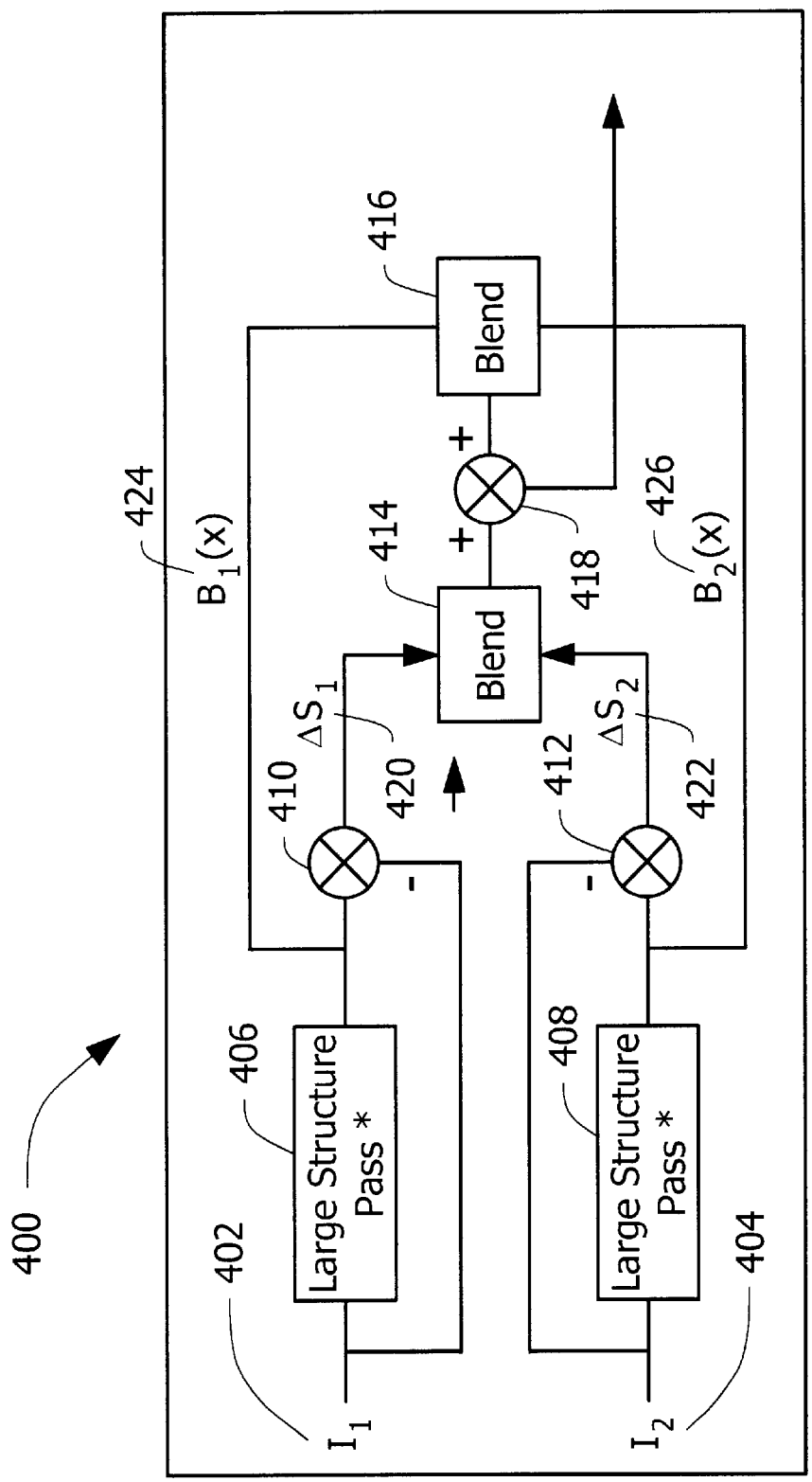
FIG. 4 shows a block diagram of a system for morphological image fusion and change detection.

FIG. 4 shows a block diagram of a system for morphological image fusion and change detection 400, employing morphological filters to process image signals from one or more scenes by separating objects or structures contained in each image signal from the background objects or structures of each image signal, based on size and orientation. The background and object images are then selectively fused into a composite image displaying desired scene information extracted from each image signal.

Small structure, or a significant change in the intensity over a given distance in the image is generally associated with objects, while large structure is associated with the background. Therefore, by removing small structure from the image signal the filter is able to distinguish and separate the objects from the background.

Referring again to FIG. 1, morphological filters create a new "large structure" image by tracing the movement of structuring element 104 as it slides below intensity plot 100, and filtering out any event, large structure, that covers a smaller area than structuring element 104. Generally, large structure contains not only the low frequencies in the image but contains also the high frequencies associated with the edges of the large structure.

Structuring element 104 defines a preselected maximum "target" structure size. This maximum "target" structure size, is the maximum size of an event in the horizontal direction, in pixels, which the filter will consider an object. Any transition in intensity requiring more pixels (a greater area) than defined by the dimensions of the structuring element will be considered by the morphological filter to be a part of the background of the scene. If the structuring element=2(n)+1, then an event 2(n) pixels or smaller will be classified as an object. The morphological filter's resolution, it's ability to distinguish objects from the background, is thus determined by the dimensions, in pixels, of the structuring element used by each morphological filter. Thus by distinguishing objects from background on the basis of size, objects can be separated from an scene without the blurring effect common in prior methods.

Figure 1:
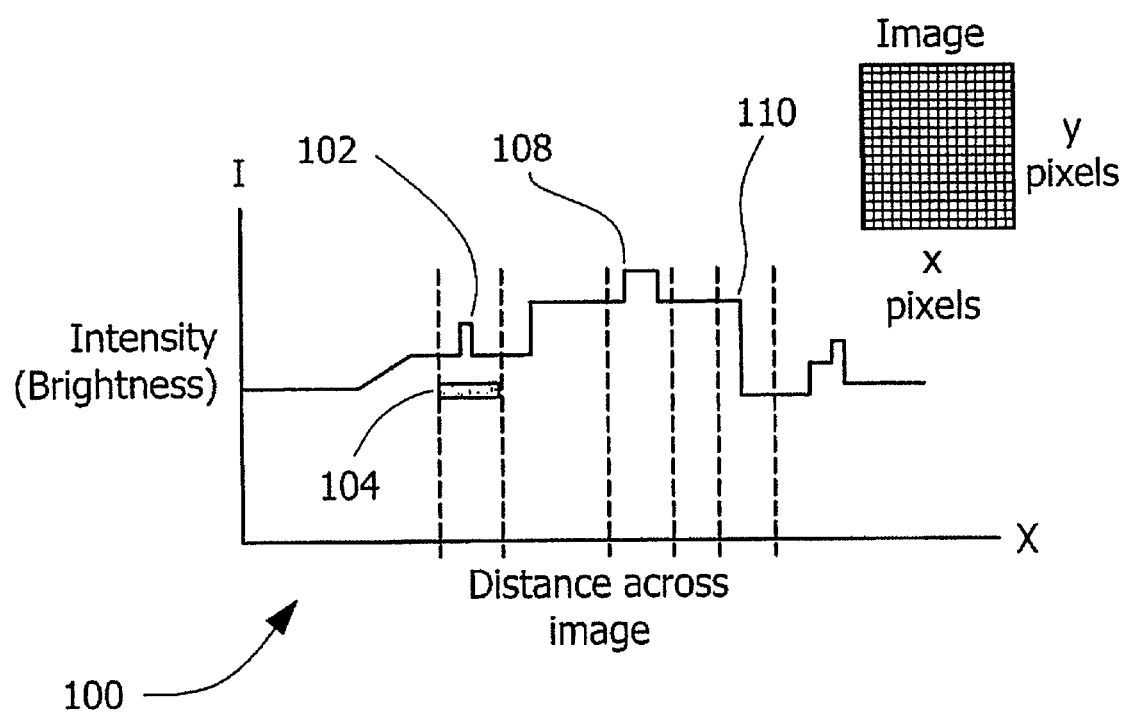
FIG. 1 shows an example intensity plot across a selected horizontal line of an image scene with a size element beneath the plot.
Figure 2:
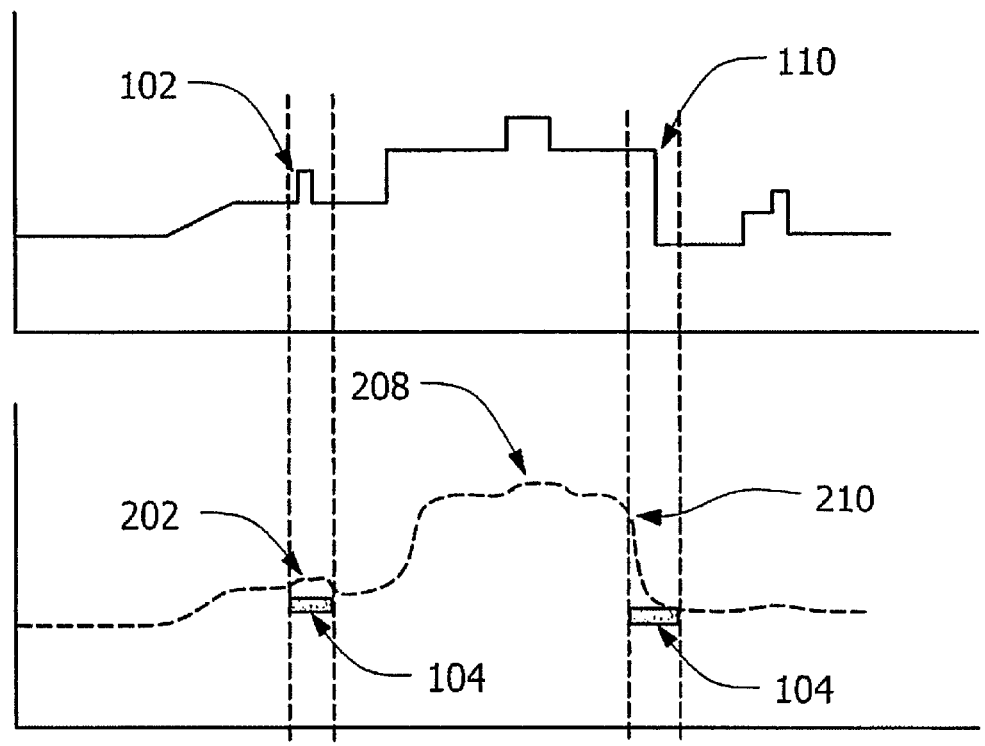
FIG. 2 shows an attempt to remove the small structure (objects) from the scene using (prior art) conventional linear filter.
Figure 3:
FIG. 3 shows the intensity plot of FIG. 1 with the small structure removed from the scene using morphological filters.

FIG. 3 shows the intensity plot of FIG. 1 with the small structure removed from the scene using morphological filters in place of the linear filters. If structuring element 104 does not "fit" up into a region of the intensity profile then it is considered to be an "object". If it does fit, it is considered to be part of the background. As depicted in FIG. 3 residual "bumps" 202 and 208 and the blurring effect 210 have been eliminated. (This technique would also have to be repeated for negative contrast objects having an intensity lower than the local background. Structuring element 104 would have to not fit "down" into an object.)

Referring now to FIG. 4 which shows an example embodiment of a system for morphological image fusion and change detection, system 400, is coupled to at least one sensing means (not shown). The sensing means may be a single sensor sampling a scene at different times, or an array of sensing devices which image a scene in IR, visible light, radar, sonar, magnetic or electric field, chemical, conventional or unconventional means or a combination thereof, simultaneously sampling the same or substantially the same scene. Image signals I1 and I2, 402 and 404, are the signals produced by sensing devices. One skilled in the art will appreciate that the sensing means is not limiting in this invention and that I1 and I2 are image signals produced by sensing means sampling a similar or substantially the same scene.

In the preferred embodiment the received image signals 402, 404 are coupled into morphological type filters 406 and 408, which separate the objects from the background via use of a structuring element.

Each morphological filter 406, 408 is coupled to a difference circuit 410, 412, which receives the filtered signal $B1(x)$ and $B2(x)$ from the morphological filters. Each morphological filter 406, 408 is also coupled to blend circuit 416, which receives the filtered image signal $B1(x)$ and $B2(x)$ produced by the morphological filter.

Difference circuit 410 is coupled to blend circuit 414. Blend circuit 414 receives the output of difference circuit 410, image signal $\Delta S1$ 420 as input.

Difference circuit 412 is also coupled to blend circuit 414. Blend circuit 414 also receives the signal produced by difference circuit 414, image signal $\Delta S2$ 422. Blend circuit 414 is also coupled to summing circuit 418 which receives the output from blend circuit 414 and the output from blend circuit 416. The output of summing circuit 418 is coupled out of the system 400.

Figure 5:
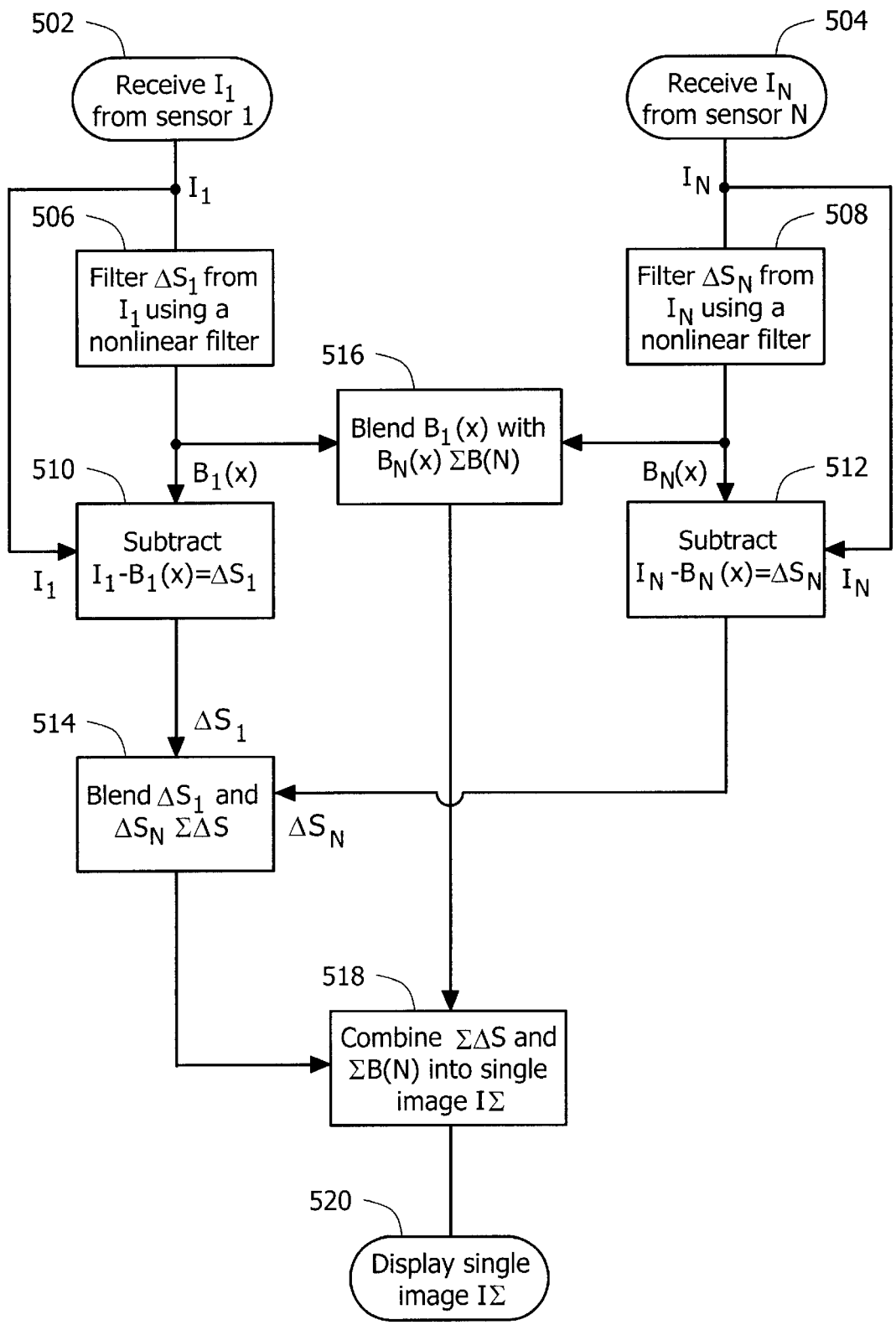
FIG. 5 shows a flowchart for a morphological image fusion algorithm.

With reference also to FIG. 5, which illustrates the flowchart 500 of the operation of the example embodiment of a system morphological image fusion 400 as illustrated in FIG. 4, image signal (I1) 402 is received into the system from sensing means 502. The morphological filter, in this example large structure pass filter 406, then removes the high frequency structure from image signal I1 as shown in block 506.

Large structure, or a change in the intensity plot of a selected portion of an image signal is generally associated with objects while small structure is associated with the background. As discussed above by removing the small structure from the image signal, the objects are separated from the background.

The size threshold of the large structure pass filter used in the current example embodiment is determined by the size and shape of the structuring element. As the structuring element becomes smaller, an event (a change in the image signals intensity) must occupy a smaller area in order to be considered an object and filtered from the scene. This results in a change in the filters size threshold. Thus an event, an intensity change in the image signal, must occupy a smaller area on the intensity plot to fall outside the structuring element size threshold of the filter and be removed from the scene.

Referring again to the figures, difference circuit 410, receives filtered signal $B1(x)$ 424, with high frequency structure, removed from the image signal. This filtered or truncated image signal is associated with the background images of the scene sampled by sensor 1. Difference circuit 410 compares this background image signal with the unfiltered image signal I1 402, as shown in block 510, the difference of which represents the object images $\Delta S1$ 420 contained in the scene sampled by sensor 1.

In the example embodiment, this filtering process is repeated on a second image signal. Image signal I2 is received by the filter circuit from the sensor and large structure pass filter 408 or another type of nonlinear filter employs a structuring element to filter small structure from the scene 508. The filtered signal $B2(x)$ is coupled into blend circuit 416, and is combined with the filtered signal $B1(x)$ to form a composite background image $\Sigma B(n)$, as shown in 516 of FIG. 5. This composite background image may be a combination of each background image produced by each filter, a combination of selected background images or the composite may contain a background image produced by a single filter.

The filtered signal B2(x) is also coupled into difference circuit 412, which receives background image B2(x) and compares this background image signal with the unfiltered image signal (I2) 404, as shown in block 512, the difference of which represent the object images ΔS2 422 contained in the scene sampled by sensor 2.

Blend circuit 414 receives object image signals ΔS1 and ΔS2, produced by difference circuits 410 and 412 respectfully, and may selectively fuse or combine these signals into a composite object image, ΣΔSn, 514 containing object images from each of the scenes sampled.

These signals may then be selectively combined with composite background scene ΣB(N) 518 and displayed as a single image scene 520.

Figure 6:
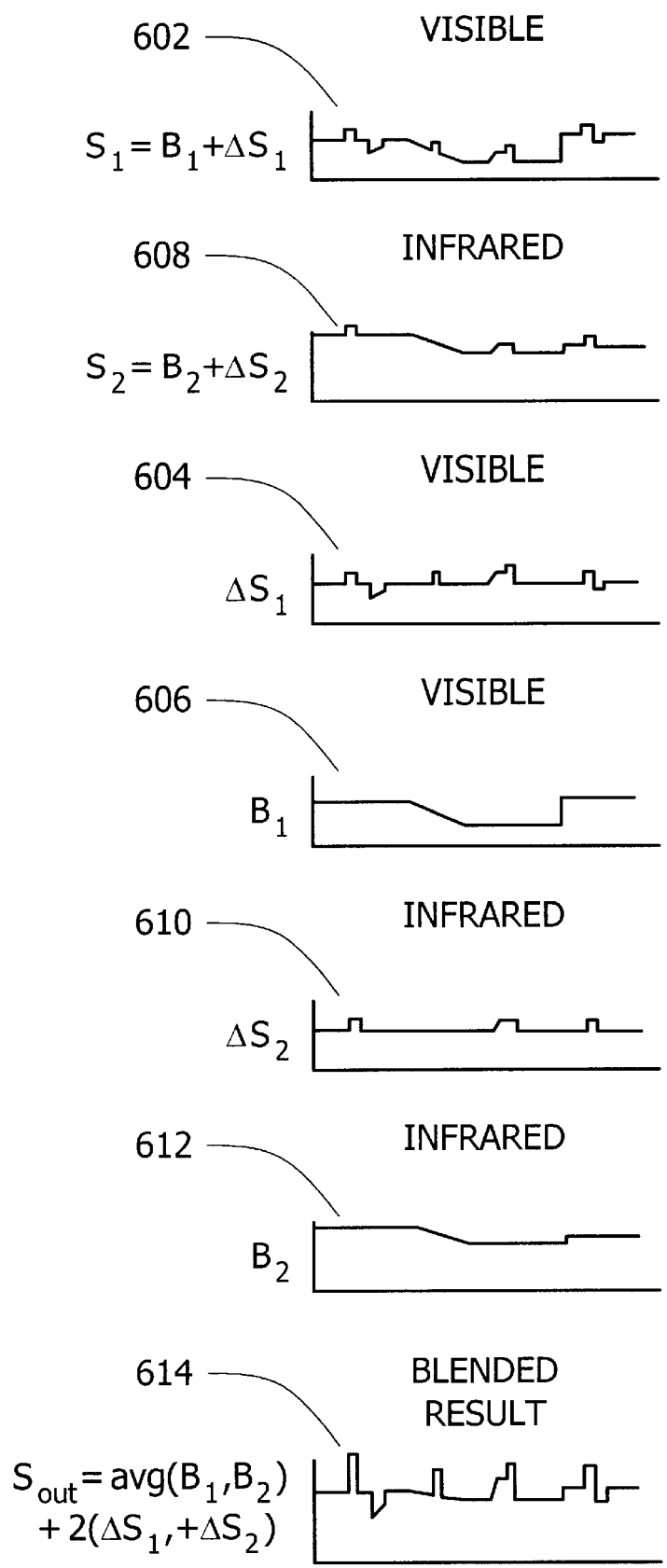
FIG. 6 illustrates an example series of intensity plots 6(a)–6(g) received and produced by the example circuit of FIG. 4.

FIG. 6 illustrates an example series of one dimensional intensity plots 6(a)–6(g) received and produced by the example circuit of FIG. 4. Assume for the purposes of this example that the I1 and I2 image signals received from the sensor means are represented by S1 and S2 in the FIG. 6. FIG. 6(a) represents (S1) image 402 of a scene sampled by a sensor operating in the visible light spectrum as received from sensor 1, 402 in the example circuit of FIG. 4. The S1 image, 602, includes background (B1) and object (ΔS1) images. FIG. 6(b) represents the S2 image 608 of the same scene sampled by a sensor operating in the infrared light spectrum as received from sensor 2, 404 in the example circuit of FIG. 4. The S2 image, 608, includes background (B2) and object (ΔS2) images. When morphological filter 406 receives (S1) image 402, the morphological filter removes small structure, events smaller than the structuring element, to produce background (B1) image 606 sampled by sensor 1 as shown in FIG. 6(d). The difference between image (B1) 606 and (S1) image 602 represent ΔS1 object images 604 detected in the visible light spectrum by sensor 1 as illustrated in FIG. 6(c). Likewise, filter 408 receives image (S2) 404, morphological filter removes small structure, events smaller than the structuring element, to produce (B2) background image 612 sampled by sensor 2 as shown in FIG. 6(f). The difference between image (B2) 612 and image (S2) 608 represent object (ΔS2) images 610 detected in the infrared light spectrum by sensor 2 as illustrated in FIG. 6(e).

Once image scenes sampled by each sensor are separated into background and image signals, the system builds a composite scene from selected image and background signals. This composite image scene may be selected objects and backgrounds from each sensor, objects alone or any combination of object images and background images separated based on size and selectively fused into a single image signal which may be displayed on a single output device. The selection may be automatic, or based on image size, position, object orientation, or other user selected variable. FIG. 6(g) displays a composite image containing both object images and background images from both S1 and S2 sensors.

In a preferred embodiment, morphological filters are implemented using basic erosion/dilation operations, also known as min/max operations. During erode/dilate operations, the system slides the structuring element under the intensity plot of the image, processing the section of the image over the structuring element pixel by pixel. The erode/dilate operation consist of the morphological filter looking sequentially at each pixel in the image and comparing that pixels intensity with the intensities of the neighboring pixels. This structuring element is moved one pixel at a time, with erode or dilate operations being performed on each pixel covered by the mask until every pixel in the image scene has been processed. Once each pixel in the image scene is sampled and eroded or dilated the system will make subsequent passes on the convolved image produced by the previous erosion or dilation operation. Depending on whether the system is performing an erosion or a dilation, the intensity of the pixel being sampled will be replaced by the minimum value of the neighboring pixel within the area defined by the structuring element, or the maximum value of the neighboring pixels, respectively, within the area defined by the structuring element.

In another embodiment, the image processing is expanded to two dimensions. In two dimensions the structuring element becomes a two dimensional structuring element thus the shape, in addition to the size of the structuring element determines the size and the shape of the objects that are removed from the image. Hence, in two dimensions the target structure becomes any two dimensional intensity profile into which at least one long thin structuring element will "fit".

The system processes the image by making multiple passes, eroding and dilating the pixel in the center of the structuring element based on neighboring pixels with horizontal, vertical and/or diagonal orientations. As discussed above, the system will use the structuring element to make several scans of the image, eroding on one or more passes, and dilating on one or more subsequent passes. The system also may alter the order of dilating and erosion operations to filter different types of objects from an image. For example if the erosion operation is followed by a dilation operation small, negative contrasting objects will be removed from the image. If the dilation operation is performed first, followed by erosion, small positive contrasting objects will be removed.

Figure 7:
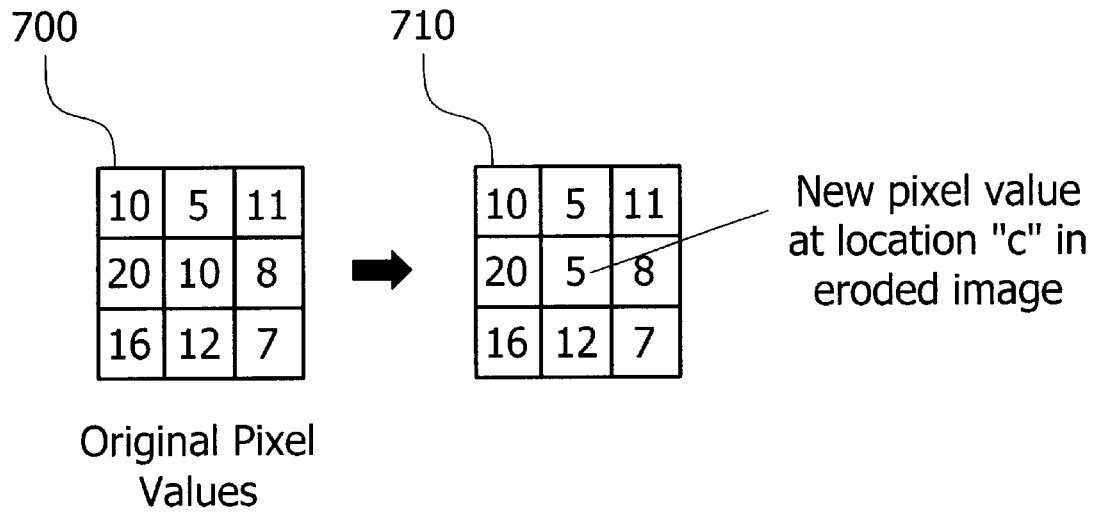
FIG. 7 illustrates vertical erosion process performed on a 3 pixel×3 pixel area of an image scene.

FIG. 7 illustrates a 3×3 pixel area of an image scene sampled by one of the above mentioned sensors. As discussed earlier, the size of the area sampled at one time by the morphological filter is a function of the size of the structuring element. In the FIG. 7 example, the area sampled is a 3×3 pixel area, hence assume for purposes of this example the structuring element selected is a 3×1 pixel vertical rectangle strip. Therefore, any event requiring 3 pixels or more in the vertical direction will be classified as part of the background.

When performing erosion/dilation operations, the system selects pixels sequentially, and compares the intensity of the selected pixel to the intensities of the surrounding pixels. Referring to FIG. 7, each block represents a pixel and the value illustrated in each block represents the intensity of that particular pixel. If, for example, one wanted to filter object images having positive contrasting intensities, the processor would first perform erosion operations, followed by dilation operations. With continued reference specifically to FIG. 7 in performing vertical erosion the processor selects the pixel in the center of the fame, in this case having an intensity of 10 magnitude, and compares it to its neighboring pixels in the vertical plane, shown here as having intensities of 5 and 12 magnitude. The processor then performs an erosion operation, by adjusting the value of the sampled pixel's intensity to correspond with intensity of its lowest vertical neighbor within the sampled structuring element mask. Thus, the eroded pixel value would be adjusted from 10 to 5 magnitude. Upon completion of the erosion operation on that pixel, the processor moves the structuring element mask by one pixel, and repeats the operation for the next pixel until all of the pixels in the image's vertical plane have been selected. The processor then takes the eroded image and performs a dilation operation. Dilation is similar to erosion except that the values of the selected pixel is adjusted to correspond with the magnitude of the largest neighboring pixel.

Figure 8:
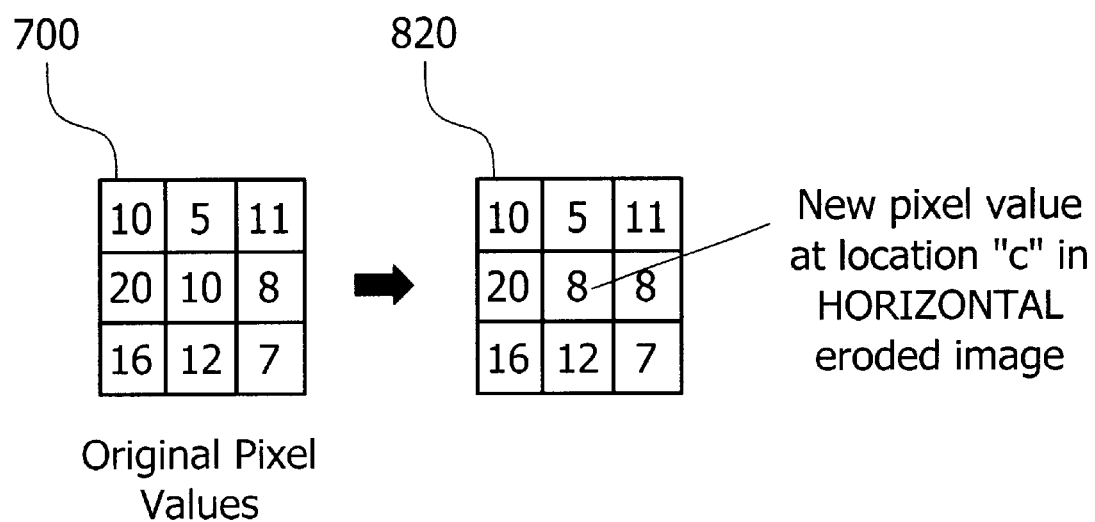
FIG. 8 illustrates horizontal erosion process performed on a 3 pixel×3 pixel area of an image scene.

In yet another variation the erode/dilate operations may be restricted to pixels neighboring the center pixel having a specific orientation in relation to the center pixel. For example, the neighboring pixels which are compared to the center pixel can be restricted to only certain neighboring locations, for example those only in horizontal direction. FIG. 8 illustrates an example of horizontal erosion. The original image 700, shows a magnitude of 10 for the center pixel which is being convolved. In horizontal erosion the magnitude of the pixels directly adjacent to the center pixel, in the horizontal direction are used to erode the center pixel. The eroded image mask 820 shows the magnitude of the center pixel minimized based on the smaller of the two horizontal adjacent pixels. By repeating this operation "N" times, the resultant pixel value at any location is equal to the minimum pixel value in the original image within a range of plus or minus N pixels in the horizontal direction (or within the area defined by the structuring element). The N 3×1 pixel erosions in the horizontal direction followed by N3×1 dilations in the horizontal direction produce the effect of a structuring element of length 2N+1 pixels in the horizontal direction. This structuring element will remove positive contrast structure. To create the same size structuring element to remove negative contrast structure the order of the dilates and erodes are reversed. (I.e., first perform N dilations and follow with N erosions.)

Horizontal dilation operations are similar to erosion except that the center pixel is replaced by the maximum value of the specific neighborhood pixels rather that the minimum values.

In addition to horizontal erosion and dilation, vertical and diagonal erosion and dilation operations are possible. In vertical erosion/dilation the center pixels intensity is compared to the directly adjacent pixels in the vertical direction. In diagonal erosion/dilation the center pixel's intensity is convolved based also on the directly adjacent pixels, however this time in each of the diagonal directions.

Figure 9:
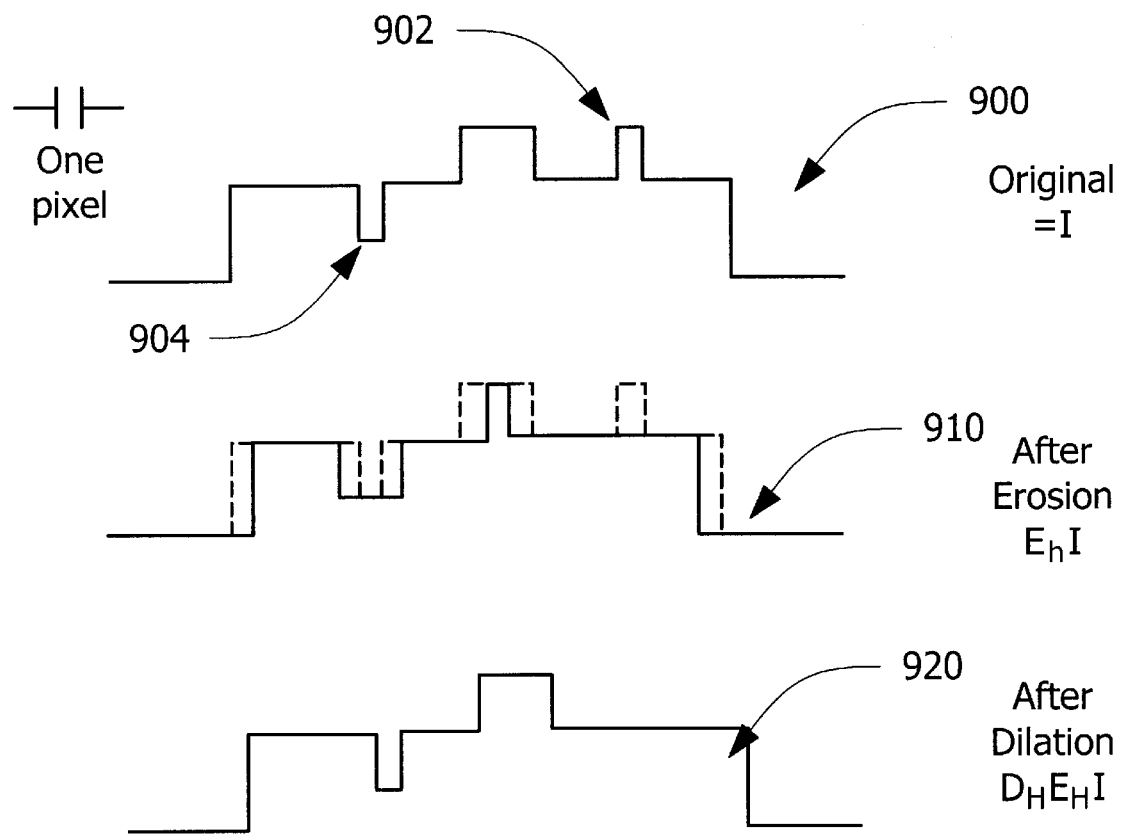
FIG. 9 shows a series of intensity plots in which small positive contrasting objects are removed by erosion operations followed by dilation operations.

As discussed above, the order and the orientation of the dilation and erosion operations may be combined to remove structure having a specific characteristics. For example, if erosion operations are followed by dilation operations, small objects having positive contrast are removed from a scene. FIG. 9 displays a series of intensity plots in which small positive objects are removed by erosion operations followed by dilation operations. Referring to FIG. 9, the original image 900, contains several events having, positive 902 and negative 904 contrast. The first pass, using a structuring element three pixels across, horizontal erosion operations are performed, the resulting intensity plot 910 shows the change in the plot, resulting from the erosion operation. Specifically, the removal of some structure designated as objects, based on size, is shown as a broken line. A dilation operation is then performed on the eroded intensity plot 910, producing the intensity plot 920. Note that positive contrast events 902 smaller than the structuring element, thus designated as objects have been filtered, while the negative contrasting event 904 remains.

Figure 10:
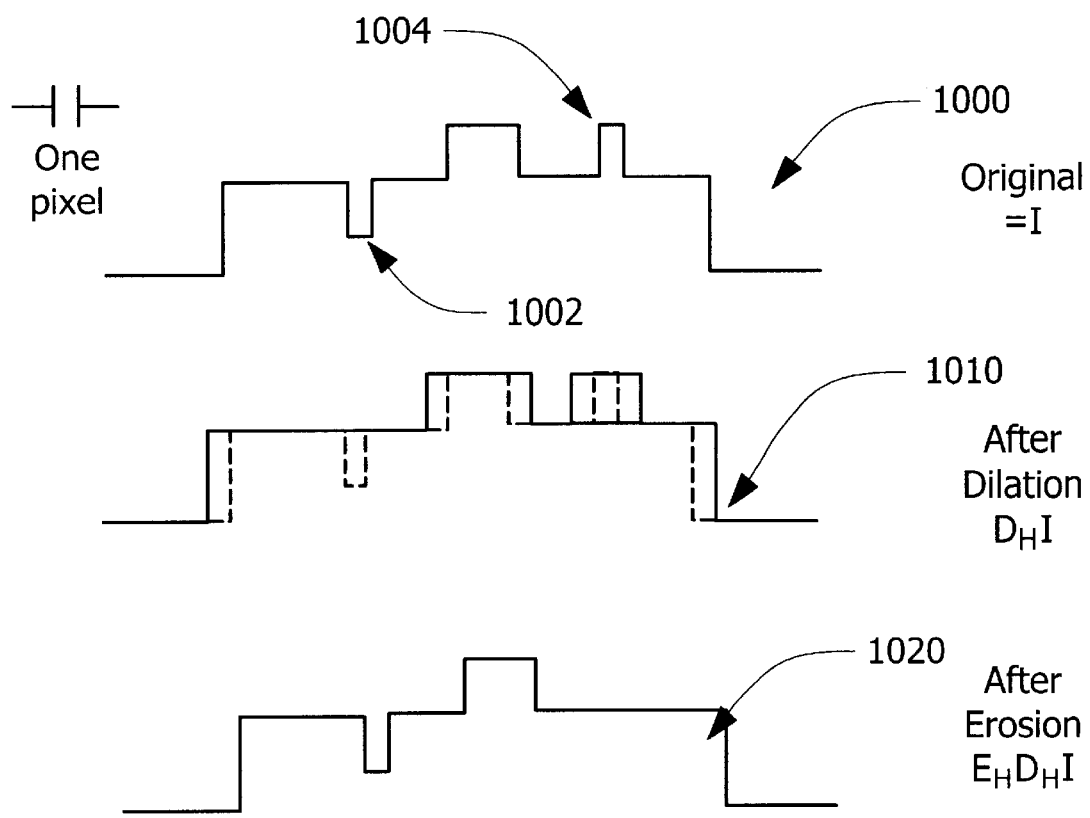
FIG. 10 shows a series of intensity plots in which small negative contrasting are removed by erosion operations followed by dilation operations

In a second example erosion operations can be preceded by dilation operations to remove small objects having a negative contrast. FIG. 10 displays a series of intensity plots in which small negative objects are removed by erosion operations followed by dilation operations. Referring to FIG. 10, the original image 1000, contains several events having, positive 1004 and negative 1002 contrast. In the first pass, using a structuring element three pixels across, horizontal dilation operations are performed, the resulting intensity plot 1010 shows the change in the plot, resulting from the dilation operation. Specifically, the removal of some structure designated as objects, based on size are shown as a broken line. An erosion operation is then performed on the eroded dilated plot 1010, producing intensity plot 1020. Note that the negative contrast objects 1002 smaller that the structuring element have been removed, while the positive events 1004 remain.

The size and shape of the structuring element need not be limited to 3×1 horizontal or vertical elements as described previously. The structuring could be any 2 dimensional size and shape as long as the dilate/erode or minimum/maximum is performed over all of the pixels within the shape. For example, the structuring element could be a three by three square. A dilate would consist of creating an image with the pixel value at any location equal to the largest pixel within the area defined by the particular shape of the structuring element. If the 3×3 structuring element is used, then a background object or structure is any 2 dimensional intensity distribution which "fits' within the a 3×3 square.

The use of a sized structuring element in determining what structure to filter from a scene allows one to filter not only discrete objects but also linear structure greater than a specified length. This structure may or may not be part of an actual object.

Figure 11:
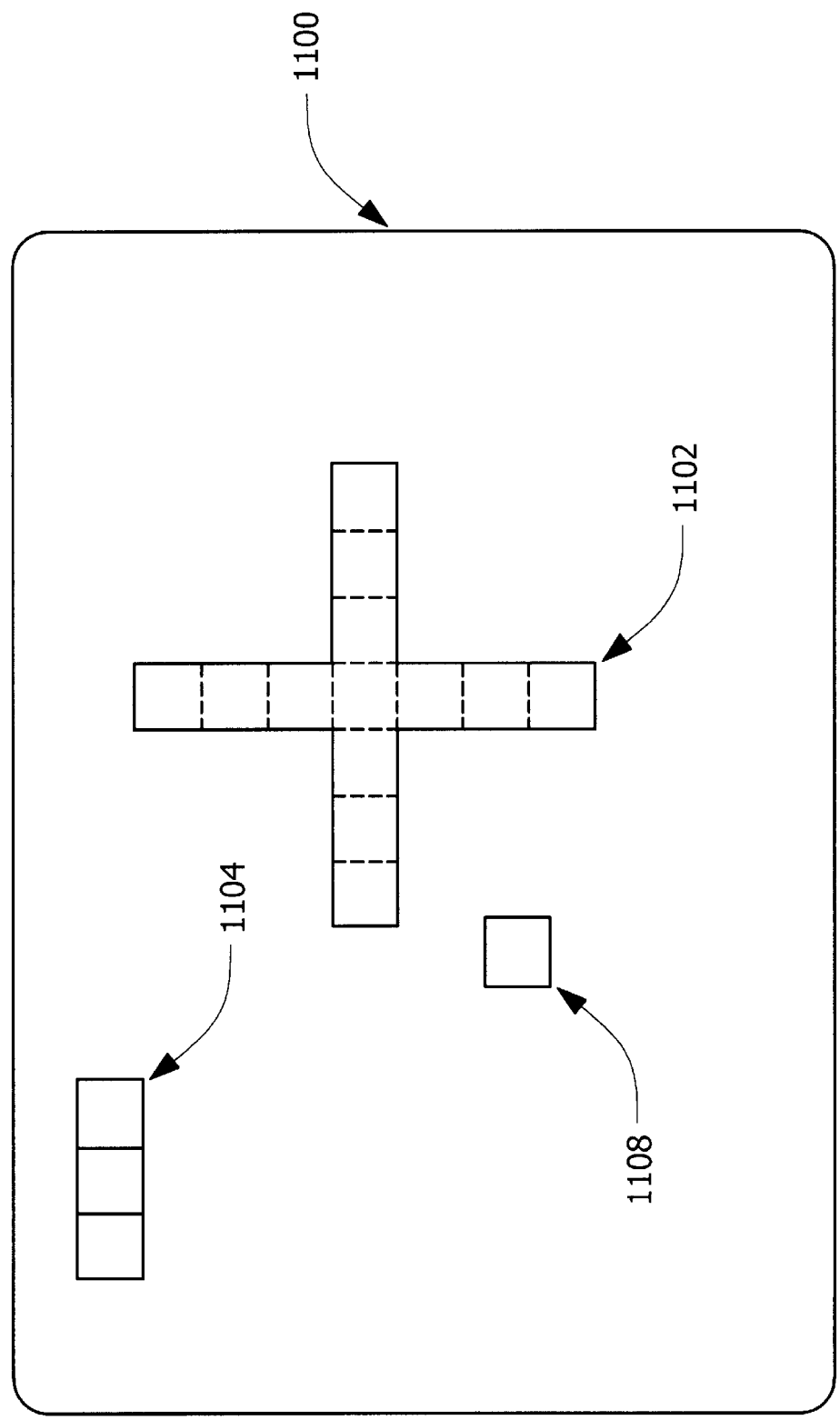
FIG. 11 shows a scene with a single isolated pixel object and a multi pixel cross image.

In yet another example, consider the image shown in FIG. 11, in which a single isolated pixel object 1108 is desired to be extracted and fused into a new image. In this case the background is any structure greater than one pixel across in any direction. Consider, further the case where the image 1100 contains a large cross 1102 which is NOT desired to be in the fused image.

Each arm of cross 1102 is one pixel thick but many pixels long. If the previously described procedure were followed such as a horizontal erode/dilate, the single pixel 1108 would be removed but also the vertical arm of cross 1102 would be removed. This would result in the vertical arm of cross 1102 appearing in the final fused image which is not the desired result. If a vertical erode/dilate were used then the horizontal arm of cross 1102 would appear in the fused image—also undesirable.

Prior art linear approaches are ill-equipped to deal with this type of scene, providing poor performance and marginal resolution.

Use of the disclosed system for image fusion employing morphological filters in a size based approach solves this problem allowing one to define the background as any intensity structure which is removed by a one pixel thick linear structuring element 1104 of the desired length but at any orientation. This approach prevents long thin structure from "leaking through" into the fused image. The disclosed approach employs at least a horizontal and a vertical structuring element at a minimum. In a preferred embodiment the system performs at least two other diagonal orientations for improved performance. (I.e., diagonal of lower left to upper right and upper left to lower right.) Each structuring element 1104 is applied individually to the image using the dilate/erode sequence discussed above. Also, each structuring element 1104 is applied individually to the image using the erode/dilate sequence. The results of each of the structuring element applications are then combined.

In two dimensions positive background structure is defined as a linear structure in which the structuring element of the (proper length) but any orientation "fits' within the 2 dimensional intensity profile of the image. Alternately, negative background structure is defined as a linear structure in which the structuring element of the (proper length) but any orientation "fits' within the 2 dimensional intensity profile of the image. By selecting various combinations and subtraction of these spatial filterings with different orientations and contrasts, one can obtain a fused image containing structure of the desired size.

This method "fuses" linear structures rather than objects. Most objects are composed of various combinations of linear structures.

In general the large structure positive background image may be obtained by dividing all of the structuring element processed images into two groups. One group containing the processing which started with a dilate followed by erodes, and the other group which started with erodes followed by dilates. Each group contains a processed input image filtered with a structuring element at each angular orientation, e.g., horizontal, vertical, and diagonals.

Next, two resultant images are generated. The positive contrast background structure is obtained by taking the maximum pixel value at each location from each of the angular orientations for the filtering which started with an erode operation. The negative contrast background structure is obtained by taking the minimum pixel value from all of the angular orientations which started with a dilate operation.

Finally, the small structure from all of the images to be fused is obtained by subtracting the positive and negative contrast backgrounds from the original image. This combination of the various orientations of linear 1×N structuring elements is called a "Cross Filter" and is part of the method for processing the image signals. This methodology fused imagery is based on linear structural content within the imagery. The structure need not be part of an actual object. This approach based on structure eliminates many of the spurious artifacts of other image fusion approaches that base the fusion on very small local details within the imagery. Small changes in the fine details result in large variations in the quality of the fused image.

The erosion/dilation methods described above can be combined into one or a series of nonlinear filters which, by virtue of the sequence of and/or orientation of the erode/dilate operations can remove objects or structure having particular intensity characteristics in two dimensions. The example morphological filter, as shown in FIG. 12, may be constructed to remove positive and negative contrast objects from a background scene.

Figure 12:
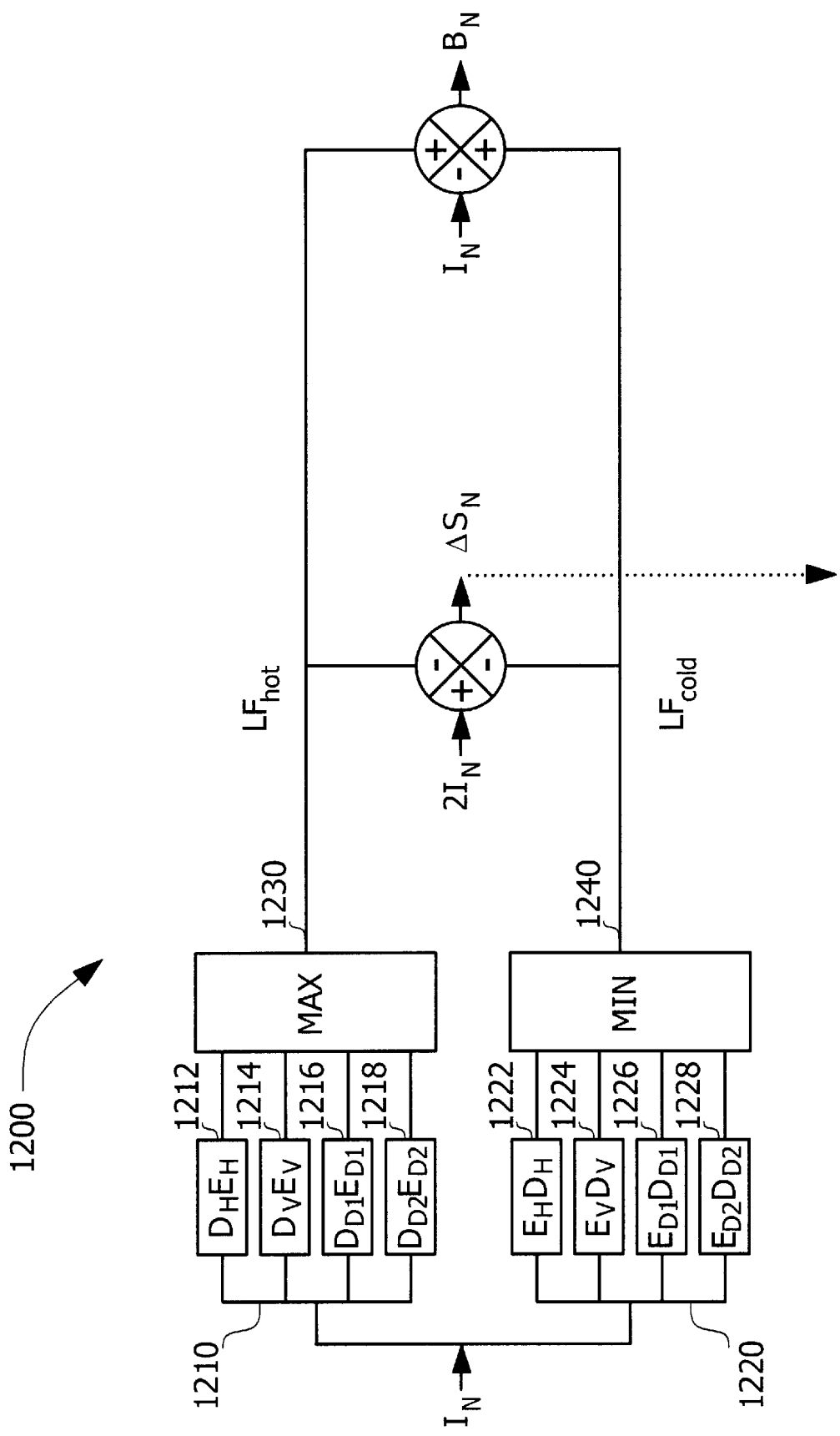
FIG. 12 illustrates and example of a multi dimensional nonlinear cross filter.

Referring to FIG. 12, the cross filter is constructed to use 2 dimensional processing to remove both positive and negative contrasting objects from image signal, I. Cross filter 1200 comprises two processing banks, 1210, 1220 each bank employing a combination of erosion and dilation methods to remove negative or positive contrasting objects form image signal I. First processing bank 1210, employs, erosion operations followed by dilation operations in two dimensions. The image signal may be simultaneously processed with horizontal 1212, vertical 1214, and two diagonal 1216, 1218 dilations, each of which are followed by the corresponding erosion operations. The processed signals from each combination of dilation preceding erosion operations are then combined into a single signal (LFh), 1230 representing only large positive contrasting structure.

A second processing bank 1220 also receives the image signal, simultaneously processing the image using dilation operations followed by erosion operations. Similar to first processing bank 1210, the image signal may be simultaneously processed with horizontal 1222, vertical 1224, and two diagonal 1226, 1228 erosions, followed by corresponding dilation operations. The processed signals from each combination of erosion preceding dilation operations are then combined into a single signal (LFc), 1240 representing the large negative contrasting structure.

The morphological filter then combines the LFc and LFh signals produced by processing banks 1210, and 1220, into a single signal containing large negative and positive contrasting structure. This combined signal has the small structure, objects, removed and reflects the background of the image scene I. This twin bank cross filter 1200 may be substituted as filter 406 in the block diagram of FIG. 4. System 400 then compares the large structure background image with the image scene I, the difference $\Delta S1$ reflecting the objects within the image scene I.

In yet another embodiment, the system may employ a single morphological or other non-linear sensor which will capture multiple images of the same scene at different times. Each of these signals can be processed and compared with the original image scene to detect any change in the object or background images. Similarly, the signals need not be simultaneously processed using multiple processors. A system may sequentially process images using a single processor.

In yet another embodiment, multiple arrays of sensors may be bundled into a single sensor package, producing a multitude of signals, which may be simultaneously processed by a multitude of morphological filters or sequentially processed by a single morphological filter.

In yet another embodiment the object images and background images from different sensors can also be color coded for display, for example infrared background images may be displayed in red, infrared objects may be displayed in orange, visible light background images may be displayed in green, and visible light objects in blue, etc.

For example, all objects which appeared in source image A but not in source image B could be colored green. All objects which appeared in both source images could be colored blue, etc. (Note that portions of an object made could be displayed in different colors if the original object was not completely captured in all of the sensor images.) In addition, the color intensity or saturation can be proportional to the objects intensity. Also, objects could be eliminated or colored differently if their intensity is below a certain user defined threshold.

The superior resolution and accuracy of structure removed via the use of the disclosed system employing morphological filters also provides a solution to the color stability problem common in linear methods. Since the object and background is defined based on structure, rather than a weighted average of the local pixels, the blurring effect and the related color stability problem is solved.

A typical color coding scheme would be to color only the objects as described above while displaying the background as monochrome. Thus the objects stand out but the remaining background is still visible.

The foregoing descriptions of the preferred embodiments are intended to be illustrative and not limiting. It will be appreciated the numerous modifications and variations can be made without departing from the spirit or scope of the present invention.

What is claimed is:

1. A method for processing two or more image signals, each of said image signals produced from sampling substantially the same scene, comprising the steps of:
   a) receiving a first and second image signals from at least one sensing means;
   b) designating background images and object images in each of said two or more image signals on the basis of their size using a plurality of structuring elements including a horizontal structuring element, a vertical structuring element, and two diagonal structuring elements; and
   c) separating said background images from said object images in said first and second image signals.

2. The method of claim 1 wherein said separating step is performed using at least one morphological type filter.

3. The method of claim 1 wherein said designating step is preformed by selecting structure within the image signal that is larger than said structuring element and designating said selected structure as background images.

4. The method of claim 1 wherein said designating step is preformed by selecting structure within the image signal that is smaller than said structuring element and designating said selected structure as object images.

5. The method of claim 1 wherein said separating step is preformed by employing erode/dilate operations.

6. The method of claim 1 wherein said object images in said image signals are selectively combined into a composite object image.

7. The method of claim 1 wherein said background images from said image signals are selectively combined into a composite background image.

8. The method of claim 1, wherein:
   the designating includes filtering by a) separately applying each of the structuring elements to each of the image signals using a dilate/erode sequence, and b) separately applying each of the structuring elements to each of the image signals using an erode/dilate sequence;
   the separating includes a) grouping the filtered image signals into two groups, a first group containing the signals filtered using the dilate/erode sequence and the second group containing the signals filtered using the erode/dilate sequence, b) forming a negative contrast background image using, at each location in the negative contrast background image, the minimum pixel value from the corresponding locations in the first group of filtered signals; and c) forming a positive contrast background image using, at each location in the positive contrast background image, the maximum pixel value from the corresponding locations in the second group of filtered signals.

9. The method of claim 8 comprising subtracting the positive and negative contrast background images from the corresponding unfiltered image signals.

10. A system for fusing two or more image signals comprising:
    at least a first and a second signal input means;
    at least a first and a second non linear filter, said first nonlinear filter being coupled to said corresponding first signal input means and said second nonlinear input filter being coupled to said corresponding second signal input means, said first nonlinear filter receiving a first input image signal through said first input means producing a first background image signal and a first object image signal, said second nonlinear filter receiving a second input image signal through said second input means producing a second background image signal and a second object image signal;
    a first signal coupler, said signal coupler coupled to each of said at least two nonlinear filters, blending said first and second object image signals and at least one of said background image signals into a composite image signal;
    an output display, said output display receiving said composite image signal from said signal coupler and displaying said composite image signal.

11. The system of claim 10 further comprising a second signal coupler, said signal coupler coupled to each of said nonlinear filters and said first signal coupler, said second coupler receiving said first and said second background image signals from at least two of said nonlinear filters, blending said first and second background image signals into a composite background image.

12. The system of claim 10 wherein at least one of said nonlinear filters is a morphological filter.

13. The system of claim 12 wherein at least one of said morphological filters is a cross filter.

14. The system of claim 13 wherein at least one of said cross filters erosion operations precede dilation operations.

15. The system of claim 13 wherein at least one of said cross filters dilation operations precede erosion operations.

16. A method for fusing two or more image signals, comprising:
    receiving first and second image signals;
    filtering the first image signal via at least a first non linear filter to produce a first background image signal and a first object image signal;
    filtering the second image signal via at least a second non linear filter to produce a second background image signal and a second object image signal;
    blending said first and second object image signals and at least one of said background image signals into a composite image signal; and
    displaying the composite image signal.

* * * * *

UNITED STATES PATENT AND TRADEMARK OFFICE
CERTIFICATE OF CORRECTION

PATENT NO. : 6,816,627 B2
DATED : November 9, 2004
INVENTOR(S) : Norman Ockman

It is certified that error appears in the above-identified patent and that said Letters Patent is hereby corrected as shown below:

Column 13,
Lines 20, 24 and 29, change "preformed" to -- performed --.

Signed and Sealed this

Twenty-first Day of June, 2005

JON W. DUDAS
*Director of the United States Patent and Trademark Office*